J. B. HENDERSON.
HYDRAULIC RELAY FOR GUN MOUNTINGS AND THE LIKE.
APPLICATION FILED JULY 26, 1919.
1,413,162. Patented Apr. 18, 1922.
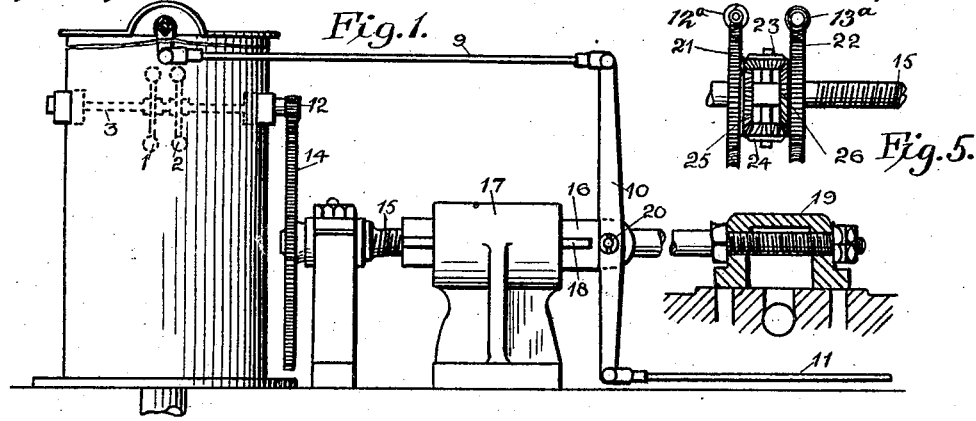
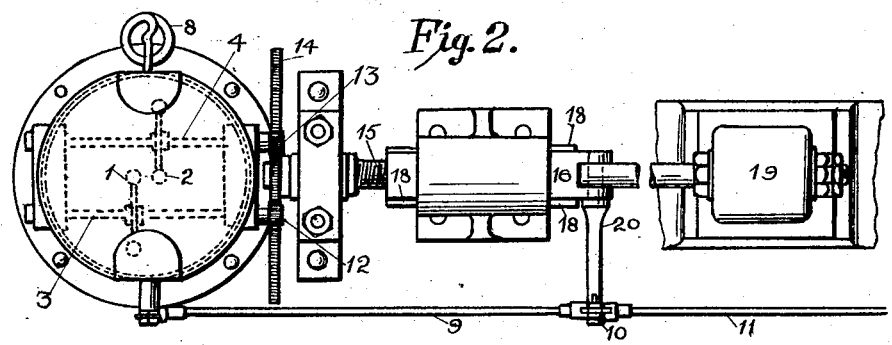
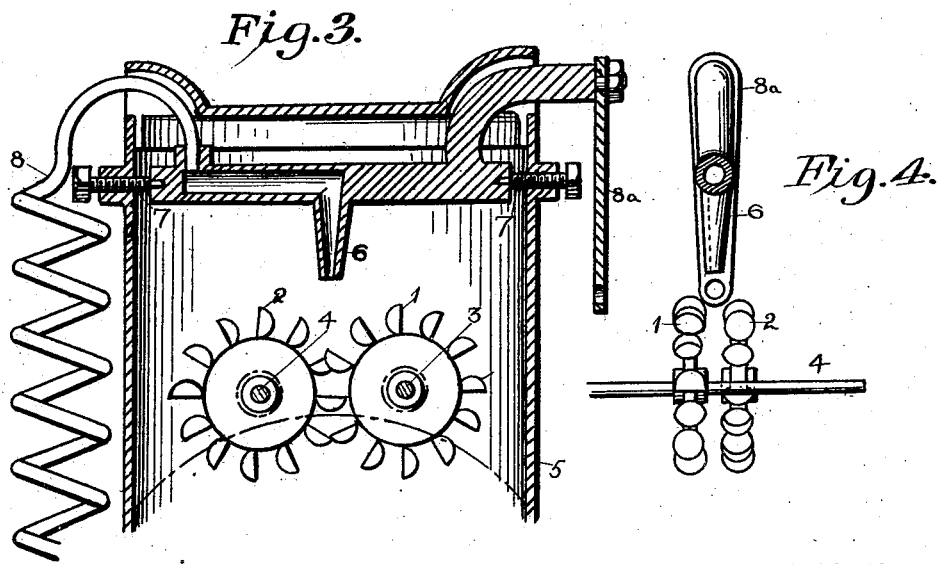
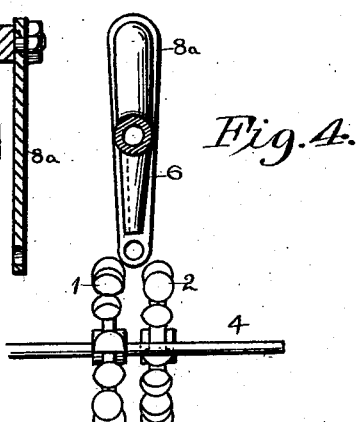
INVENTOR
James Blacklock Henderson

UNITED STATES PATENT OFFICE.

JAMES BLACKLOCK HENDERSON, OF LEE, ENGLAND.

HYDRAULIC RELAY FOR GUN MOUNTINGS AND THE LIKE.

1,413,162.	Specification of Letters Patent.	Patented Apr. 18, 1922.

Application filed July 26, 1919. Serial No. 313,531.

(GRANTED UNDER THE PROVISIONS OF THE ACT OF MARCH 3, 1921, 41 STAT. L., 1313.)

*To all whom it may concern:*

Be it known that I, JAMES BLACKLOCK HENDERSON, a subject of the King of Great Britain, residing at 2 Cambridge Road, Lee, in the county of Kent, England, have invented certain new and useful Improvements in Hydraulic Relays for Gun Mountings and the like, (for which I have filed an application in England No. 2660, February 15, 1916,) of which the following is a specification.

The object of my invention is to produce a relay or servo-motor of the hydraulic type, say for use in actuating valves and the like, in which the friction on the light moving parts will be reduced to a minimum so as to be suitable for use in the control of gun mountings and other mechanisms in which the controlling forces are supplied by gyroscopes or other controlling mechanisms to the apparatus by which the controlled mechanisms may be operated.

My invention can also be applied for actuating the valves of a turbine in a water-turbine installation for actuating the tiller of a steering gear and for many other purposes.

My invention consists in providing two oppositely rotating motors of the Pelton wheel type for actuating the valve gear or the like and in controlling by means of the gyroscope or other mechanism, a movable water jet so that it impinges on one or other of the wheels according to the movement of the gyroscope, the jet being linked to the valve gear so that it is rendered inoperative after a given movement of the gear has been effected.

Fig. 1 shows a side elevation of the gear designed according to my invention.

Fig. 2 shows a plan.

Fig. 3 shows a sectional elevation showing the rotors and jet.

Fig. 4 is a side view of the rotors and jet, and

Fig. 5 is a detailed view of the mechanism whereby hunting of the relays is prevented.

In carrying my invention into effect I employ two small rotors 1 and 2 similar to those used in Pelton wheel turbines which I arrange on two parallel shafts 3 and 4 in the same horizontal plane, the distance between the shafts being equal to twice the radius of the Pelton wheels measured out to the center of the buckets. These shafts 3 and 4 are carried in bearings in the cylindrical outer casing 5. The two rotors are so placed on the shafts that the distance between the adjacent buckets of the two rotors is just sufficient to allow the jet of water which drives the wheels to pass through between them without touching either rotor. The nozzle 6 (Fig. 3) from which the jet emerges is pivoted about an axis 7 at right angles to the two parallel shafts, the vertical plane through the pivot axis passing between the rotors, and the water is supplied to the nozzle through the flexible pipe 8 (Fig. 3) or other suitable connection. The nozzle is connected to the gyroscope or other controlling mechanism by the crank $8^a$ and the links and levers 9, 10 and 11 (Figs. 1 and 2) so that when movement of the link 11 takes place to right or left the jet is directed on to and drives one or other of the Pelton wheels 1 and 2.

The rotor shafts 3 and 4 are connected through the spur pinions 12 and 13 engaging with the spur wheel 14, with the mechanism which actuates the valve to be controlled. This mechanism is illustrated by the screw 15 and nut 16 the nut 16 moving axially in the supporting bracket 17 and being prevented from turning in that bracket by the two feathers 18. The nut 16 is connected directly or by links with the valve 19 which is shown as an ordinary D slide valve.

To prevent hunting and maintain stability I link the nut 16 to the nozzle 6 so that when the jet is brought on to one or other of the two Pelton rotors 1 and 2 the subsequent movement of the nut 16 takes the jet off the rotor again. This may be done conveniently by mounting the pin 20, on which the lever 10 turns as fulcrum, on the nut 16 as shown in Figs. 1 and 2. A motion of the control rod 11 to the right moves the jet to the left and makes it play on the rotor 1. The spur wheel 14 and screw 15 are thereby turned and move the nut 16 to the right thus taking the jet back to its central position. Alternatively the movement of the valve mechanism controlled by the relay might be used to cut off the supply of fluid to the jet after a given amount of movement is effected.

Instead of spur gearing I may use belt and pulleys, or chain gearing or worm and worm-wheel. Since worm and worm-wheel gearing with large velocity ratio is not directly reversible I would replace each of the pinions 12 and 13 by a small worm 12$^a$ and 13$^a$ gearing respectively with worm wheels 21 and 22 as shown in Fig. 5. The two worm wheels 21 and 22 are connected by a jack-in-the-box mechanism or other suitable differential gear the screw 15 being rotated by the motion of the epicyclic pinions 23 and 24 which are rotated in one or other direction by the bevel pinions 25 and 26 which are compound respectively with the worm wheels 21 and 22.

Although the mechanism is described as being worked by a jet of water it is equally suitable for working by a jet of steam or air or other fluid the nozzle being designed in each case to give a parallel jet.

The Pelton wheels do not necessarily rotate in opposite directions, they might be coaxial and rotate in the same direction, the reversing motion being introduced in the mechanism connecting them to the valve.

Having now particularly described and ascertained the nature of my said invention and in what manner the same is to be described I declare that what I claim is:—

1. Apparatus for controlling the operation of one mechanism by another comprising a plurality of fluid actuated members, means for directing a stream of fluid on the members selectively, means adapted to be actuated by the controlling mechanism for determining the direction of the stream and means connected to the members for actuating the controlled mechanism.

2. Apparatus for controlling the operation of one mechanism by another comprising a plurality of fluid actuated members, means for directing a stream of fluid on the members selectively, means adapted to be actuated by the controlling mechanism for determining the direction of the stream and means connected to the members for actuating the controlled mechanism, both of said last named means being inter-connected so that movement of the latter by the members causes actuation of the former and the directing means independently of the controlling mechanism.

3. Apparatus for controlling the operation of one mechanism by another comprising a pair of fluid actuated members, means for directing a stream of fluid on the members selectively, means adapted to be actuated by the controlling mechanism for moving the directing means to determine the direction of the stream and means connected to the members for actuating the controlled mechanism.

4. Apparatus for controlling the operation of one mechanism by another comprising a pair of fluid actuated members, a device for directing a stream of fluid on the members selectively, means adapted to be actuated by the controlling mechanism for moving the device to determine the direction of the stream and means connected to the members for actuating the controlled mechanism, both of said means being interconnected so that movement of the second means by the members causes actuation of the first means and the device independently of the controlling mechanism.

5. Apparatus for controlling the operation of one mechanism by another comprising a pair of fluid actuated wheels, a nozzle for directing a stream of fluid on the wheels selectively, means adapted to be actuated by the controlling mechanism for moving the nozzle to determine the direction of the stream and means connected to the wheels for actuating the controlled mechanism.

6. Apparatus for controlling the operation of one mechanism by another comprising a pair of fluid actuated wheels, a nozzle for directing a stream of fluid on the wheels selectively, means adapted to be actuated by the controlling mechanism for moving the nozzle to determine the direction of the stream and means whereby the nozzle may be moved by movement of the last named means independently of the controlling mechanism.

7. Apparatus for controlling the operation of one mechanism by another comprising a pair of fluid actuated members, a device for directing a stream of fluid on the members selectively, means adapted to be actuated by the controlling mechanism for moving the device to determine the direction of the stream, means connected to the members for actuating the controlled mechanism, and means whereby the device may be moved by movement of the last named means independently of the controlling mechanism.

8. Apparatus for controlling the operation of one mechanism by another comprising a pair of fluid actuated wheels, a device for directing a stream of fluid against one or the other of the wheels, means adapted to be actuated by the controlling mechanism for moving the device to cause the stream to impinge against the wheels selectively, means connected to the wheels for actuating the controlled mechanism, and means whereby the device may be moved by movement of the second-named means reversely to the movement imparted to it by the first-named means.

Dated this 24th day of July 1919.

JAMES BLACKLOCK HENDERSON.